(12) United States Patent
Hiller et al.

(10) Patent No.: US 9,500,230 B2
(45) Date of Patent: Nov. 22, 2016

(54) BEARING CAGE AND BEARING MEANS HAVING THIS TYPE OF BEARING CAGE AS WELL AS METHOD FOR DESIGNING, REPAIRING AND/OR REPLACING SUCH A BEARING CAGE

(71) Applicant: MTU Aero Engines AG, Munich (DE)

(72) Inventors: Sven-Juergen Hiller, Erdweg (DE); Erwin Bayer, Dachau (DE); Thomas Hess, Munich (DE); Peter Geiger, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 14/693,388

(22) Filed: Apr. 22, 2015

(65) Prior Publication Data

US 2015/0308502 A1 Oct. 29, 2015

(30) Foreign Application Priority Data

Apr. 29, 2014 (DE) .................. 10 2014 208 040

(51) Int. Cl.
| | |
|---|---|
| *F16C 27/04* | (2006.01) |
| *F16C 33/46* | (2006.01) |
| *B22F 3/105* | (2006.01) |
| *B22F 5/10* | (2006.01) |
| *F16C 33/66* | (2006.01) |
| *F01D 25/16* | (2006.01) |
| *F16F 15/04* | (2006.01) |

(Continued)

(52) U.S. Cl.
CPC .......... *F16C 33/4629* (2013.01); *B22F 3/1055* (2013.01); *B22F 5/10* (2013.01); *F01D 25/164* (2013.01); *F16C 27/04* (2013.01); *F16C 27/045* (2013.01); *F16C 33/6659* (2013.01); *F16C 33/6681* (2013.01); *F16F 15/04* (2013.01); *B33Y 10/00* (2014.12); *B33Y 80/00* (2014.12); *F05D 2230/31* (2013.01); *F05D 2250/283* (2013.01); *F05D 2260/311* (2013.01); *F05D 2260/38* (2013.01); *F16C 2360/23* (2013.01)

(58) Field of Classification Search
CPC ...... B22F 3/1055; B22F 5/10; F04D 29/046; F04D 29/49; F04D 29/59; F01D 25/16; F01D 25/262; F01D 25/164; F16C 27/045
USPC ............................ 384/535, 581, 99; 415/119
See application file for complete search history.

(56) References Cited

U.S. PATENT DOCUMENTS

| | | | | |
|---|---|---|---|---|
| 2006/0083449 | A1* | 4/2006 | Laurant | F16C 27/04 384/99 |
| 2007/0086685 | A1* | 4/2007 | Klusman | F01D 25/125 384/99 |
| 2009/0110543 | A1* | 4/2009 | Alam | F01D 25/164 415/142 |

(Continued)

FOREIGN PATENT DOCUMENTS

| | | |
|---|---|---|
| DE | 102006049216 A1 | 4/2008 |
| DE | 102011086775 A1 | 1/2013 |

(Continued)

*Primary Examiner* — Phillip A Johnson
(74) *Attorney, Agent, or Firm* — Barlow, Josephs & Holmes, Ltd.

(57) ABSTRACT

The invention relates to a bearing cage of a bearing means, in particular a ball or roller bearing, which is produced by means of a generative manufacturing method and has an outer flange and a bearing seat, which are joined together via a plurality of spring beams.

17 Claims, 3 Drawing Sheets

(51) Int. Cl.
*B33Y 10/00* (2015.01)
*B33Y 80/00* (2015.01)

(56) References Cited

U.S. PATENT DOCUMENTS

2013/0108202 A1\* 5/2013 Do .................... F01D 25/164
 384/572
2013/0280063 A1\* 10/2013 Ganiger ................ F16C 19/54
 415/229
2013/0315523 A1\* 11/2013 Bedenk ................ F01D 25/162
 384/581

FOREIGN PATENT DOCUMENTS

| EP | 1630357 | A2 | 1/2006 |
| EP | 2149681 | A2 | 2/2010 |
| EP | 1630357 | A3 | 6/2011 |
| EP | 2149681 | A3 | 4/2013 |
| EP | 2682207 | A2 | 1/2014 |

\* cited by examiner

BEARING CAGE AND BEARING MEANS HAVING THIS TYPE OF BEARING CAGE AS WELL AS METHOD FOR DESIGNING, REPAIRING AND/OR REPLACING SUCH A BEARING CAGE

BACKGROUND OF THE INVENTION

The present invention relates to a bearing cage and a bearing means having this type of bearing cage as well as a method for designing, repairing, and/or replacing such a bearing cage. A bearing means having this type of bearing cage is utilized, in particular, in a compressor or a turbine of an aircraft engine or a stationary gas turbine—for example, a ship turbine or a motor vehicle turbine.

In general, the bearing cages or spring cages for bearings, such as, for example, ball bearings or roller bearings that comprise bearing cages or spring cages with spring beams, are milled from a single piece. However, this has the drawback that it is not possible to do so in the case of a bearing or spring cage with multiply folded spring beams. Instead, the spring beams have to be attached as separate parts in this case, which makes this type of bearing or spring cage complicated and expensive.

BRIEF SUMMARY OF THE INVENTION

Against this background, the invention is now based on the object of providing an improved bearing cage.

According to the invention, a bearing cage of a bearing means, in particular a ball bearing or a roller bearing, is now provided, said bearing cage being produced by means of a generative manufacturing method and having an outer flange or outer ring and a bearing seat, which are joined together via a plurality of spring beams.

The bearing cage has the advantage that, owing to the generative manufacturing of the bearing cage, it is possible to produce multiply folded bearing cages from a single piece and it is not necessary as in the past to assemble them from separate parts. Another advantage is that, owing to the generative manufacturing of the bearing cage, it is possible to vary at will the cross sections, cross-sectional course, and the number and form of the spring beams, depending on the function and intended use thereof in each case.

The realization/idea on which the present invention is based consists in producing a bearing cage by means of a generative manufacturing method and, in particular, in forming the spring beams in this process in one piece with the other parts of the bearing cage, such as, for example, an outer flange or ring, an intermediate ring, a bearing seat, etc.

Advantageous embodiments and enhancements of the invention are discussed in detail below and shown in the attached drawings.

In an embodiment according to the invention, the bearing cage has a first intermediate ring, which is joined in a single piece to the outer flange via first spring beams.

According to another embodiment according to the invention, the first intermediate ring is joined in a single piece to a second intermediate ring via second spring beams. In this way, it is possible to design a folded structure with a plurality of rows of spring beams in the bearing cage.

In another embodiment of the invention, the second intermediate ring is joined in a single piece to the bearing seat via third spring beams. As a result, it is possible to achieve further folding of the bearing seat.

In another embodiment according to the invention, the second spring beams are arranged offset with respect to the first spring beams and/or the third spring beams are arranged offset with respect to the second spring beams. In this case, the spring beams can be arranged in the peripheral direction uniformly or non-uniformly offset relative to the other associated spring beams. For example, the spring beams can be arranged in the peripheral direction offset by half a pitch division with respect to the other associated spring beams.

According to one embodiment of the invention, the bearing seat is formed with at least one pocket, which is connected to at least one oil line for supplying an oil film or a squeeze film. Such a pocket with an oil line can be formed in the bearing cage by means of generative manufacturing method in a very simple and cost-effective manner.

In another embodiment according to the invention, the at least one oil line is formed in the bearing seat, in the at least one spring element, in the at least one intermediate ring, and/or in the outer flange. In this way, it is possible to design the course of the oil line in any way, depending on its function and intended use. In this case, the generative manufacturing of the bearing cage allows great freedom of design in forming and integrating the oil line.

In another embodiment according to the invention, a respective bearing, in particular a ball bearing or a roller bearing, can be taken up in the bearing seat. In this case, the bearing can additionally be fixed in place in the axial direction by a bearing fixation element.

In an aircraft engine, the bearing taken up in the bearing cage according to the invention can be used, in particular, to bear a shaft that joins a turbine portion of the aircraft engine to a compressor portion of the aircraft engine. This shaft can be, for example, a shaft—for instance a hollow shaft—that joins a high-pressure turbine to a high-pressure compressor or that joins a low-pressure compressor to a low-pressure compressor. In this case, the bearing cage is able to cushion forces that act on the shaft when the aircraft drops in an air pocket, for example.

In another embodiment according to the invention, the bearing cage is designed as a non-folded bearing cage having only one row of spring beams. Alternatively, however, the bearing cage can be designed as or be a multiply folded bearing cage. In comparison to a non-folded bearing cage, a multiply folded bearing cage has the advantage that, when the bearing is deflected in relation to the structural components to which the bearing cage is fastened, the axis of symmetry of the bearing remains axially parallel to the axis of rotation, so that a shaft borne in the bearing experiences no warping.

According to another embodiment according to the invention, at least one spring beam has a constant cross section or a varying cross section. Depending on the load being accommodated, the spring beam can then be specifically adjusted and is simple to implement by means of the generative manufacturing method. In particular, it is possible to define specifically a nonlinear spring characteristic of the spring beam by appropriately configuring the cross section, with the cross section preferably varying over the length of the spring beam. This can be accomplished by means of a generative method in an especially simple manner.

In addition, it is possible by eccentric fabrication of the flange and/or the bearing seat with respect to a housing (stator) surrounding the bearing cage to compensate for the weight of the shaft (rotor) such that the rotor and the stator are arranged concentrically in relation to each other in spite of the intrinsic weight of the rotor, which presses downward on the spring beams of the bearing cage.

In another embodiment according to the invention, the first, second, and/or third spring beams have the same length and/or the same cross section or else have a different length and/or a different cross section.

Advantageously, at least one stop element is arranged between two adjacent component segments of the bearing cage, which are joined together via at least one of the spring beams in such a way that they can move in relation to each other. Preferably, a plurality of stop elements are provided, in particular at least four stop elements. These stop elements can be formed to be integral with one of the two component segments, in particular by generative manufacturing. The at least one stop element serves to prevent any undesired contact between rotor and stator at another place or at least to reduce it. In particular, when the bearing cage according to the invention is used for bearing a shaft in an aircraft engine, it is possible by way of the at least one stop element to prevent the rotor blades from coming into contact too strongly with the abradable coating of one of the rotors during exceptional loads, such as, for example, an especially hard touchdown on landing or especially strong turbulence in flight.

Preferably, in this case, one stop surface of the at least one stop element abuts a counter stop surface of one of the two component segments, with a surface contour of the stop surface being designed to be complementary to a surface counter of the counter stop surface. If the one component segment is, for example, the annularly designed flange of the bearing cage and the other component segment is the second intermediate ring of the bearing cage, and if the stop element is arranged on the second intermediate ring between the second intermediate ring and the flange, then a free surface or the stop surface of the stop element can preferably have the same arc-shaped curvature as the opposite-lying counter stop surface of the annular flange.

It is of marked advantage when the at least one stop element is designed in such a way that a deformation of the stop element occurs under the effect of a defined load on the at least one stop element. In this case, the deformation can be elastic and/or plastic. As a result, the at least one stop element can specifically absorb impact energy in the short term, so that this impact energy cannot be transmitted or is transmitted only to a reduced extent onto the rotating shaft. This is of particular interest, for example, in the case of a crash landing of an aircraft, the aircraft engines of which are provided with the bearing cage according to the invention for bearing of the rotor shaft.

To this end, the at least one stop element can be designed to be structurally less rigid in a middle region between its two end portions, each of which faces or is assigned to one of the two component segments, than at the end portions. For example, this middle region can be designed to be porous or else have a honeycomb structure, whereas it can be designed as solid material in its end portions.

If, in this case, the at least one stop element is designed such that, after a plastic deformation, in particular a fracture, in the middle region between the two end portions of the stop element, the two end portions are still joined together in a form-fitting manner, it is possible to prevent at least larger individual pieces of the stop element from detaching from the rest of the stop element and thereby being able to cause damage elsewhere.

The above embodiments and enhancements may be combined with one another at will insofar as this is appropriate. Further possible embodiments, further enhancements, and implementations also include not explicitly named combinations of features of the invention described above or below with respect to exemplary embodiments. In particular, in this case, the person skilled in the art will also incorporate individual aspects as improvements or extensions of the respective basic form of the present invention.

BRIEF DESCRIPTION OF THE DRAWINGS

The invention will be explained in detail below on the basis of the exemplary embodiments presented in the schematic figures of the drawings. Shown are.

In the figures of the drawing, identical, functionally identical, and identically acting elements, features, and components—unless otherwise indicated—are each provided with the same reference numbers.

DETAILED DESCRIPTION OF THE INVENTION

Figure 1:
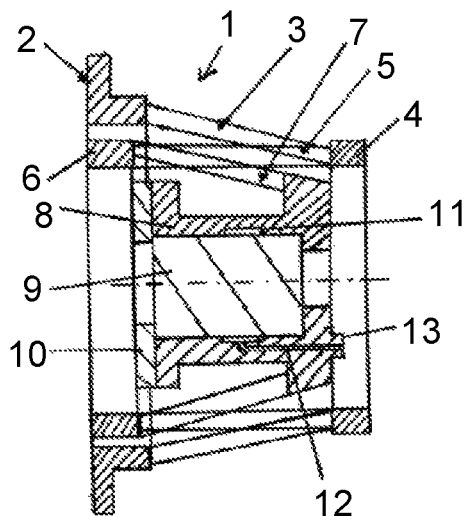
FIG. 1 a sectional view of a folded bearing cage according to a first embodiment of the invention.

Shown in FIG. 1 is a sectional view of a folded bearing cage 1 according to a first embodiment of the invention.

In turbomachines, the bearings are often furnished with so-called bearing cages (Engl. squirrel cages). Such a bearing cage makes possible a defined rigidity of a housing structure. Bearing cages to date have been composed of an outer ring or an outer flange, which is joined to a surrounding housing. This outer ring is joined via spring beams to an inner ring, to which, for example, a ball or roller bearing is then fastened directly or indirectly. The rigidity of the bearing cage is determined above all by the number, the cross sections, and the lengths of these spring beams. In this case, these spring beams have been produced to date in a classical manner by milling them out of an integral component. As a result, however, the form and the spacing of the spring beams are limited.

The required length of such spring beams is in part very large. In this case, a so-called folded spring cage is used. Instead of directing the spring beams in one direction, they are divided up and then directed radially back together further inside. However, this requires a new component with screw connections, because classical milling does not allow a folded cage to be produced from a single component. However, this increases the weight, the number of snug fits, the number of required tolerances, and accordingly the production costs.

According to the invention, therefore, a bearing cage or spring cage 1, in particular a folded bearing or spring cage 1, is produced by means of a generative manufacturing method. In this case, the bearing cage or spring cage 1 can be used for a bearing in an engine, a stationary gas turbine, a motor vehicle gas turbine, a ship gas turbine, etc.

The generative manufacturing method makes it possible to produce, as shown in FIG. 1, a multiply, for example triply, folded bearing cage or spring cage 1 (Engl. squirrel cage) as a single component. In the following, the term bearing cage will be used consistently, with it being possible to replace this term correspondingly by the term spring cage.

As shown in the sectional view of the first embodiment of a bearing cage 1 according to the invention, the bearing cage 1 has an outer flange 2. Arranged on the outer flange 2 is a first row of first spring beams 3. The first spring beams 3, in turn, are joined to a surrounding first intermediate ring 4 of the bearing cage 1. Formed on the first intermediate ring 4, preferably at the same place or on the same side, is a second or middle row of second spring beams 5. In this case, the second spring beams 5 of the second row are offset in the peripheral direction, for example, with respect to the first spring beams 3 of the first row of the outer flange 2. For example, the second spring beams 5 can be offset in the peripheral direction by half a pitch division with respect to the first spring beams 4.

The second spring beams 5 of the second or middle row are joined to a second, additional intermediate ring 6. A third or inner row of third spring beams 7 is formed on the second intermediate ring 6, preferably at the same place or on the same side. In this case, the third spring beams 7 can be arranged in the peripheral direction, for example, offset with respect to the second spring beams 5 of the second row. For example, the third spring beams 7 can be arranged offset in the peripheral direction by half a pitch division with respect to the second spring beams 5. The third spring beams 7 of the third or inner row are joined to a bearing seat 8. The actual bearing 9 is arranged in this bearing seat 8. In this case, the bearing 9 is, for example, a ball bearing or a roller bearing, etc. and can be fixed in axial position with a bearing fixation element 10, as illustrated in the exemplary embodiment in FIG. 1. In this case, the bearing fixation element 10 can be fabricated as a component formed separately from the rest of the bearing cage 1, said component being joined to the rest of the bearing cage 1 after introduction of the bearing 9 into the bearing seat 8 so as to fix in place or secure the bearing 9 axially.

As is shown in the exemplary embodiment 1, at least one pocket 11 for supplying an oil or squeeze film can be provided in the bearing seat 8. The supplied oil can be used, in particular, for lubricating and/or cooling the roller bodies in the bearing 9. For example, at least one line 12 can be formed in the bearing seat 8, which has a connection 13 for oil supply, for supplying oil to the pocket so as to form the squeeze film.

The bearing cage 1 with the outer flange 2, the first, second, and third spring beams 3, 5, 7, the first and second intermediate rings 4, 6, and the bearing seat 9 is produced according to the invention preferably as a single part by means of a generative manufacturing method. In this case, the generative manufacturing method also enables at least one respective pocket 11 for supplying a squeeze film as well as at least one oil line 12 for supplying oil to the pocket 11 to be formed with an oil connection 13 in the bearing seat 8.

The generative manufacturing methods by means of which a bearing cage 1 according to the invention can be produced include, for example, so-called rapid prototyping and so-called rapid manufacturing. In generative manufacturing, components are built up, in particular, by a layerwise deposition of material. Generative manufacturing methods include, for example, laser sintering, selective laser sintering (SLS), electron beam sintering, electron beam melting (EBM), laser cusing, selective laser melting (SLM), or 3D printing, etc. In this case, the material being added or deposited is processed in powder form—for example, as a metal powder or a metal alloy powder. The powder is applied in layers onto a base plate or a support, for example. The powder layer is then solidified in a component region by means of radiated energy to form the component. The next powder layer is then applied over this powder layer and once again selectively solidified by means of radiated energy. In this way, the component can be constructed layer by layer. The solidification of the respective powder layer occurs in this case normally on the basis of geometric data—for example, CAD data—of the component being produced. In addition, the solidification of the powder by means of radiated energy can occur without shielding or with shielding—for example, in a protective gas or inert gas atmosphere—or in vacuum. The region of the powder layer can be scanned, for example, and the component region of the powder layer can be solidified by means of radiated energy. The effect of the radiated energy is to sinter the powder in this region or to fuse it and thereby solidify it.

Figure 2:
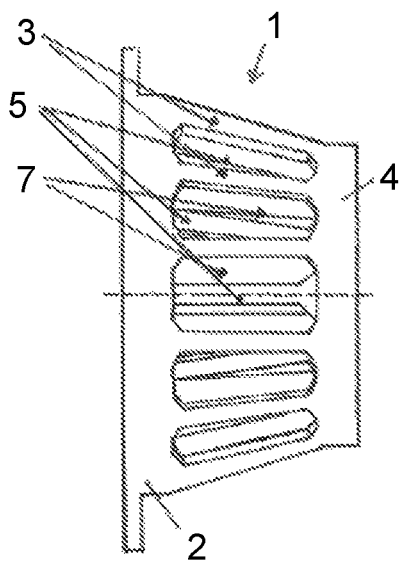
FIG. 2 the plan view of the bearing cage according to FIG. 1.

Shown in FIG. 2 is a schematic and greatly simplified plan view of the bearing cage 1 according to FIG. 1. In this case, the bearing cage 1 has the outer flange 2, on which the first or outer spring beams 3 are formed and joined to the first intermediate ring 4. In this case, the second or middle spring beams 5 are formed on the first intermediate ring 4 at the same place or on the same side and joined to the second intermediate ring 6. As is illustrated in the exemplary embodiment in FIG. 2, the second spring beams 5 are arranged offset in the peripheral direction with respect to the first spring beams 3—for example, by half a pitch division. The third or inner spring beams 7 are formed on the second intermediate ring 6 at the same place or on the same side and joined to the bearing seat. In this case, the third spring beams 7 can likewise be arranged offset in the peripheral direction with respect to the second spring beams 5—for example, by half a pitch division. The third spring beams 7 are joined to the bearing seat, in which the actual bearing is arranged. The bearing in this case is, as previously described, a ball bearing or a roller bearing, etc., for example, and can be fixed in axial position by means of the bearing fixation element.

Figure 3:
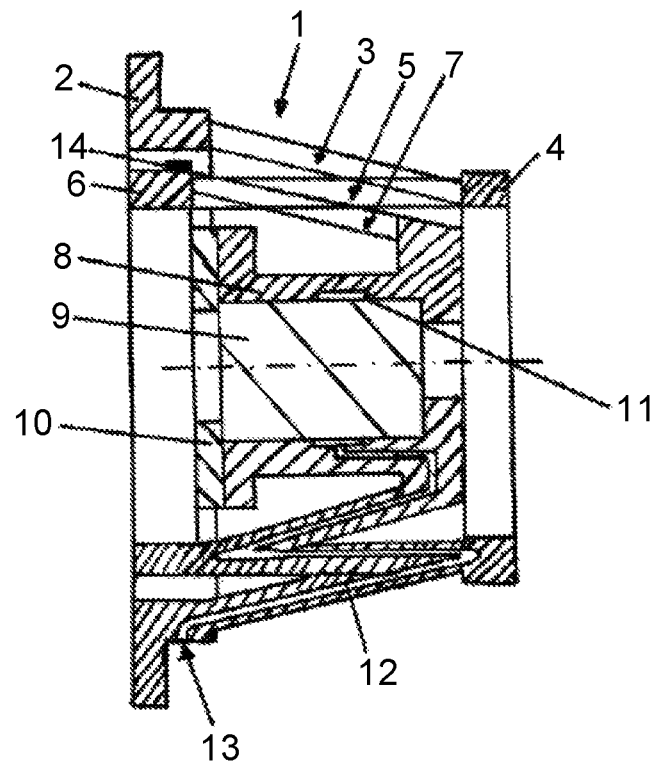
FIG. 3 a sectional view of a folded bearing cage according to a second embodiment of the invention.

Further shown in FIG. 3 is a sectional view of a folded bearing cage 1 according to a second embodiment of the invention.

The folded bearing cage 1 according to the second embodiment of the invention has substantially the same construction as the bearing cage according to the first embodiment.

The folded bearing cage 1 according to the second embodiment of the invention differs from the folded bearing cage according to the first embodiment in this case in that, on the one hand, the at least one oil line 12 for the squeeze film is integrated directly into the spring beams. The oil line 12 in this case can be directed outward in any way desired. On the other hand, a stop element 14 is shown for the second embodiment.

As is shown in FIG. 3 in the sectional view of the second embodiment of a bearing cage 1 according to the invention, the bearing cage 1 has an outer flange 2. In this case, a first row of first or outer spring beams 3 is arranged on the outer flange 2. The first spring beams 3 are, in turn, joined to a surrounding first intermediate ring 4 of the bearing cage 1, with a second or middle row of second spring beams 5 being formed on the first intermediate ring 4, preferably at the same place or on the same side. In this case, the second spring beams 5 of the second row are arranged offset in the peripheral direction, for example, with respect to the first spring beams 3 of the first row of the outer flange 2. The second spring beams 5 in this case can be arranged offset in the peripheral direction by half a pitch division, for example, with respect to the first spring beams 3.

Furthermore, the second spring beams 5 of the second or middle row are joined to a second, additional intermediate ring 6. A third or inner row of third spring beams 7 is formed on the second intermediate ring 6, preferably at the same place or on the same side. In this case, the third spring beams 7 can be arranged offset in the peripheral direction, for example, with respect to the second spring beams 5 of the second row. For example, the third spring beams 7 can be arranged offset in the peripheral direction by half a pitch division with respect to the second spring beams 5. The third spring beams 7 of the third or inner row are joined to a bearing seat 8, in which, respectively, the actual bearing 9 is arranged—for example, a ball bearing or a roller bearing, etc. In this case, the bearing 9 can be fixed in axial position, for example, by means of a bearing fixation element 10, such as is illustrated in the exemplary embodiment in FIG. 3.

As is shown in the exemplary embodiment in FIG. 3, at least one pocket 11 for supplying a squeeze film can be provided in the bearing seat 8. In order to supply the pocket 11 with oil and to form a squeeze film, at least one oil line 12 can be formed in the bearing seat 8 and, for example, in at least a third spring beam 7, with a connection for the oil supply 13. As is shown in the exemplary embodiment in FIG. 3, the at least one oil line 12 is formed in a third, second, and first spring beam 7, 5, 3 and provided with an oil connection 13. In this case, the at least one oil line 12 is directed outward via the first spring beam 3 and provided with an oil connection 13 for connection of a corresponding oil source.

The at least one oil line 12 can be integrated in any way into the spring beams 3, 5, 7 and directed outward. For example, the oil line 12 can be integrated or formed in at least a third and a second spring beam 7, 5 and, for example, directed outward via the second spring beam 5. Likewise, the oil line 12 can also be formed only in at least one third spring beam 7 and directed outward from it via, for example, via the second intermediate ring 6. The oil line 12 can be formed or integrated in any way in at least one first spring beam 3, one second spring beam 5, one third spring beam 7, the first intermediate ring 4, the second intermediate ring 6, the outer flange 2, and/or the bearing seat 8.

Like the first embodiment of the bearing cage according to the invention, the second embodiment of the bearing cage 1 according to the invention is also produced by a generative manufacturing method. As described previously, the bearing cage 1, with the outer flange 2, the first, second, and third spring beams 3, 5, 7, the first and second intermediate rings 4, 6, and the bearing seat 8 according to the invention, is preferably produced as a single part by means of a generative manufacturing method. In this case, it is possible by means of the generative manufacturing method to form also the respective, at least one pocket 11 for supplying a squeeze film as well as the at least one oil line 12 for supplying oil to the pocket with an oil connection 13 in the bearing cage 1. In addition, the bearing fixation element 10 can also be produced by means of a generative manufacturing method. This also applies to all embodiments of the invention.

By producing the spring cage, in particular the folded spring cage, by means of a generative manufacturing method, a very great compactness is achieved in the radial direction and in the structural length. The spring beams can be dimensioned in a very wide range in terms of cross section, cross-sectional course, number, and/or form when compared to conventional fabrication. The integral production enables connection elements to be dispensed with and thus saves weight, structural volume, tolerances, and corresponding costs.

Moreover, in the second embodiment of the bearing cage 1 according to the invention, at least one stop element 14 is provided between the radial inner side of the flange 2 and the radial outer side of the second intermediate ring 6. In the present example, said stop is attached to the second intermediate ring 6 and preferably formed integrally with it. Alternatively, however, said stop could just as well be attached at the flange 2. Preferably, a plurality—for example, at least four—stop elements 14 are arranged distributed in the peripheral direction between the flange 2 and the second intermediate ring 6, even though, in FIG. 3, only one stop element 14 is depicted by way of example. The stop elements 14 specifically delimit the maximum path that the second intermediate ring 6 is able to travel in relation to the flange 2. This is particularly advantageous, for example, to prevent the rotor blades from coming into too strong a contact with an abradable coating of a stator arrangement surrounding the rotor blades when the bearing cage according to the invention is used for bearing a shaft in an aircraft engine. In this case, the free surface of the stop element 14, which faces the flange 2 and which here is also referred to as a stop surface, is formed so as to be complementary to a counter stop surface of the flange 2 lying opposite to it. This means that, in the case of the embodiment illustrated in FIG. 3, the stop surface and the counter stop surface have, in particular, substantially the same curvature. Hence, when there is a contact of stop element 14 and flange 2, this contact is an area contact and not only a point or line contact.

In the event of an excessively large load acting on the engine—for example, an aircraft engine that incorporates the bearing cage according to the invention—it is advantageous when at least one stop element 14 is designed such that it can specifically deform plastically and/or elastically in order to absorb at least a portion of the energy of the load acting on it. This is of advantage, for example, during a crash landing of an aircraft having an aforementioned aircraft engine.

Various advantages structures of possible stop elements 14 are illustrated schematically in cross section in FIGS. 5a-5d. They all have in common the fact that, in their middle portion, they have a structurally lower rigidity than in the region of their end portions (respectively top and bottom in FIGS. 5a-5d). Accordingly, a specific deformation or specific failure of the middle portion occurs when a correspondingly large force (indicated by the vertical arrow in FIGS. 5b-5d) acts on the respective stop element 14.

Figure 5A:
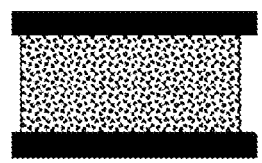
FIGS. 5a-5d various embodiments of stop elements, which are designed to be incorporated between adjacent component segments of the bearing cage according to the invention, so as to limit the maximum relative movement between these component segments.

In the exemplary embodiment according to FIG. 5a, the stop element 14 is substantially composed of two plates that are spaced apart in the radial direction, with the radially inner plate (bottom in FIG. 5a) having substantially the same curvature as the radially outer surface of the second intermediate ring 6, to which it is joined, and the radially outer plate (top in FIG. 5a) or the stop surface having substantially the same curvature as the radially inner surface or the counter stop surface of the flange 2. Provided between these two plates is a porous section, which is preferably produced generatively together with the two plates and, further preferably, also together with the rest of the bearing cage 1.

Figure 5B:
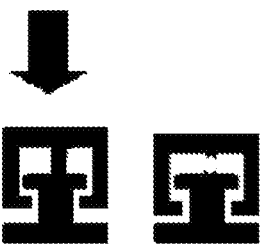

FIG. 5b shows an alternative structure of a stop element 14, which is characterized, in particular, by the fact that, upon a deformation or a fracture of the middle region of the stop element 14, the two end portions continue to remain joined to each other through form fit. Accordingly, no larger, loose component pieces of the stop element 14 enter the associated engine, such as, for example, the aircraft engine, when this element fails.

Figure 5C:
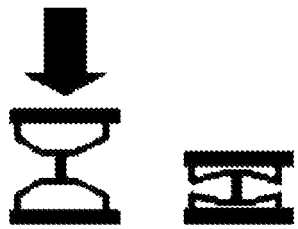
Figure 5D:
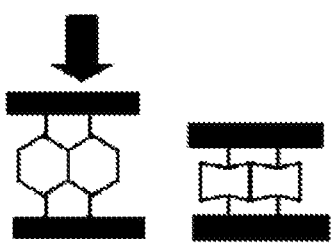

FIGS. 5c and 5d show two further alternative embodiments of a stop element, these embodiments being particularly characterized in that, in the middle region in each case, a honeycomb structure is provided between the two end portions of the stop element 14. As indicated in the figures, said structure can be specifically deformed (plastically) during corresponding action of force in order to absorb thereby impact energy in the short term.

Figure 4:
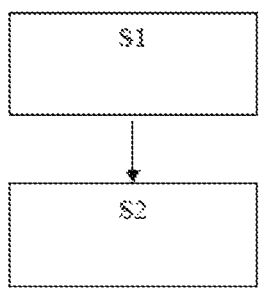
FIG. 4 a flowchart for producing a folded bearing cage according to an embodiment of the invention.

Shown in FIG. 4 is a flowchart for the production of a bearing cage according to the invention.

In a first step S1, the bearing cage according to the invention is constructed by means of the generative manufacturing method. In order to fabricate the bearing cage, a powder layer is applied onto a support or a base plate and the component region of the powder layer is fused and solidified by means of radiated energy, such as, for example, a laser beam or an electron beam, from a source of radiated energy. In this case, the component region comprises the bearing cage, as was already described, for example, with reference to FIGS. 1 to 3. The base plate is moved by one layer thickness and the next powder layer is applied to the last solidified powder layer and the new powder layer is solidified in its component region by the radiated energy from the source of radiated energy. Step S1 is repeated until the bearing cage has been produced completely from the solidified component regions. Alternatively, laser powder deposition welding or another generative method for producing the bearing cage can also be utilized.

At the end of the process, in a step S2, the non-solidified powder is removed. The bearing cage can be directly used in order to assemble it to create a bearing means having the corresponding bearings, such as ball bearings or roller bearings, etc., which are taken up in the respective bearing seat of the bearing cage. Likewise, the bearing cage can also be post-processed or post-treated, depending on function and intended use.

The bearing cage according to the invention can be produced by a generative manufacturing method from metal or a metal alloy or, depending on function and intended use, also from plastic or another suitable material or material combination.

Although the present invention has been described above on the basis of preferred exemplary embodiments, it is not limited to these embodiments, but can be modified in diverse ways and manners. In particular, the previously described exemplary embodiments and, in particular, individual features thereof can be combined with one another.

In particular, the invention is not limited to a folded bearing cage. A bearing cage having only one row of spring beams can also be provided according to the invention, said spring beams joining a flange to the bearing seat, for example. Likewise, the bearing cage can also have a double folding or more than a triple folding—for example, a quadruple folding, etc.—instead of a triple folding, as shown previously in FIGS. 1 to 3.

The invention claimed is:

1. A bearing cage (1) of a bearing, which is produced by means of a generative manufacturing method, comprising:
   an outer flange (2) and a bearing seat (8), which are joined together via a plurality of spring beams (3, 5, 7);
   a first intermediate ring (4) joined to the outer flange (2) via first spring beams (3);
   a second intermediate ring (6) joined to the first intermediate ring (4) via second spring beams (5); and
   the second intermediate ring (6) being joined to the bearing seat (8) via third spring beams (7).

2. The bearing cage according to claim 1, wherein the second spring beams (5) are arranged offset with respect to the first spring beams (3) and/or the third spring beams (7) are arranged offset with respect to the second spring beams (5).

3. The bearing cage according to claim 1, wherein the bearing seat (8) includes at least one pocket (11), which is connected to at least one oil line (12) for supplying an oil or squeeze film.

4. The bearing cage according to claim 3, wherein the at least one oil line (12) is formed running in the bearing seat (8), in at least one spring beam (3, 5, 7), in at least one intermediate ring (4, 6), and/or in the outer flange (2).

5. The bearing cage according to claim 1, wherein a bearing (9) is taken up in the bearing seat (8) and the bearing (9) is fixed in place in an axial direction by a bearing fixation element (10).

6. The bearing cage according to claim 1, wherein the bearing cage (1) is a multiply folded bearing cage (1).

7. The bearing cage according to claim 1, wherein at least one spring beam (3, 5, 7) has a constant cross section.

8. The bearing cage according to claim 1, wherein at least one spring beam (3, 5, 7) has a varying cross section, wherein the at least one spring beam (3, 5, 7) has a specifically adjusted, nonlinear spring characteristic.

9. The bearing cage according to claim 1, wherein first spring beams (3), second spring beams (5), and/or third spring beams (7) have the same length and/or the same cross section or a different length and/or a different cross section.

10. The bearing cage according to claim 1, wherein at least one stop element (14), which is formed integrally with or on the outer flange (2) or the second intermediate ring (6), or is arranged between the outer flange (2) and the second intermediate ring (6) of the bearing cage (1).

11. The bearing cage according to claim 10, wherein the at least one stop element (14) has a stop surface that lies opposite a counter stop surface of one of the outer flange (2) and the second intermediate ring (6), with a surface contour of the stop surface being complementary to a surface contour of the counter stop surface.

12. The bearing cage according to claim 10, wherein the at least one stop element (14) includes, above a defined load acting on the at least one stop element (14), a deformation of the stop element (14).

13. The bearing cage according to claim 12, wherein the at least one stop element (14) is structurally less rigid in a middle region between its two end portions, each of which faces or is assigned to one of the two component segments (2, 6), than at the two end portions.

14. The bearing cage according to claim 13, wherein, after a plastic deformation, the two end portions of the at least one stop element (14) are still joined to each other in a form-fitting manner in the middle region between the two end portions of the stop element (14).

15. The bearing cage according to claim 1, wherein the bearing is in an aircraft engine and bears a shaft, which joins a turbine section to a compressor section of the aircraft engine.

16. A method for designing, repairing, and/or replacing a bearing cage of a bearing having an outer flange (2) and a bearing seat (8), which are joined together via a plurality of spring beams (3, 5, 7), comprising the steps of:
   applying a powder layer, which can be solidified by means of radiated energy, onto a support;
   solidifying the powder layer by means of radiated energy from a source of radiated energy in a component region of the powder layer, wherein the component region is the bearing cage region;

moving the support by one layer thickness and application of the next powder layer;
solidifying the powder layer by radiated energy from a source of radiated energy in the component region of the powder layer;
repeating the preceding steps until a finished bearing cage has been constructed from the solidified component region; including the steps of:
forming a first intermediate ring (4) joined to the outer flange (2) via first spring beams (3);
forming a second intermediate ring (6) joined to the first intermediate ring (4) via second spring beams (5); and
joining the second intermediate ring (6) to the bearing seat (8) via third spring beams (7).

17. A bearing cage of a bearing, which is produced by means of a generative manufacturing method, comprising:
a bearing seat, an outer flange and a plurality of component segments, which are joined together via a plurality of spring beams;
at least one stop element arranged between the plurality of component segments.

\* \* \* \* \*